United States Patent [19]

Prouty et al.

[11] Patent Number: 5,732,248

[45] Date of Patent: Mar. 24, 1998

[54] MULTISTEP VECTOR GENERATION FOR MULTIPLE FRAME BUFFER CONTROLLERS

[75] Inventors: Bryan G. Prouty, Wellington; Kyle R. Berry, Fort Collins, both of Colo.

[73] Assignee: Hewlett-Packard Company, Palo Alto, Calif.

[21] Appl. No.: 610,600

[22] Filed: Mar. 8, 1996

[51] Int. Cl.⁶ .................................................. G06F 13/16
[52] U.S. Cl. ........................ 395/521; 395/509; 395/140
[58] Field of Search ........................ 395/521, 501–503, 395/509, 513, 523, 524, 140–143; 345/185, 189, 213

[56] References Cited

U.S. PATENT DOCUMENTS 5,222,204  6/1993  Swanson .................... 395/127
5,278,949  1/1994  Thayer ...................... 395/126
5,321,805  6/1994  Hayman et al. ............ 395/502

OTHER PUBLICATIONS

IEEE Computer Graphics and Applications, "Pixel Processing in a Memory Controlled" by Donovan et al, Jan. 1995, pp. 51–61.

Primary Examiner—Kee M. Tung

[57] ABSTRACT

A method and apparatus is provided for processing vector primitives with interleaved frame buffer controllers. Each frame buffer controller includes an edge stepper, a span stepper, and a pixel processor. Each edge stepper provides pixel data for multiple pixels during each clock cycle. Any pixels not in an area of the display assigned to a frame buffer controller are discarded without further processing. Pixels which are in the areas assigned the frame buffer controller are further processed. Additionally, two vectors may be processed simultaneously by the edge steppers.

17 Claims, 7 Drawing Sheets

MULTISTEP VECTOR GENERATION FOR MULTIPLE FRAME BUFFER CONTROLLERS

BACKGROUND OF THE INVENTION

1. Field of the Invention

The present invention relates generally to a rasterization system and method in a computer graphics system and, more particularly, to generation of vectors in multiple interleaved frame buffers.

2. Discussion of Related Art

Computer graphics systems commonly are used for displaying graphical representations of objects on a two dimensional display screen. Current computer graphics systems can provide highly detailed representations and are used in a variety of applications.

In typical computer graphics systems, an object to be represented on the display screen is broken down into a plurality of graphics primitives. Primitives are basic components of a graphics picture and may include points, lines, vectors and polygons, such as triangles. Typically, a hardware/software scheme is implemented to render, or draw, on the two-dimensional display screen, the graphics primitives that represent the view of one or more objects being represented on the screen.

Typically, the primitives that define the three-dimensional object to be rendered are provided from a host computer, which defines each primitive in terms of primitive data. For example, when the primitive is a triangle, the host computer may define the primitive in terms of the x,y,z coordinates of its vertices, as well as the R,G,B, α color values of each vertex. For a vector, the primitive may be represented by the x,y,z coordinates of its ends, as well as the R,G,B, α color values of each end. Rasterizing hardware interpolates the primitive data to compute the display screen pixels that are turned on to represent each primitive, and the R,G,B values for each pixel.

FIG. 1 illustrates the components of typical rasterizing hardware. A frame buffer controller 1 includes an edge stepper 3, a span stepper 5, and a memory controller 7. The edge stepper 3, determines through interpolation from the vertex data, the pixels along each edge of a primitive and the corresponding color values. The pixels determined by edge stepper 3 define points on the ends of lines of pixels in the primitive. A line of pixels is called a span. The span stepper 5 receives the pixel data from the edge stepper for each line of pixels and determines the color values for each pixel in the line of pixels. The pixel and color values are provided to the memory controller 7 which writes the information in a video-random access memory (VRAM) 9 or other types of memories. A display controller (not shown) drives the display based upon the contents of the VRAM.

Since the calculation process in the edge stepper 3 and span stepper 5 is complicated, the process can be slow. Using more than one frame buffer controller in parallel can increase the processing speed. FIG. 2 illustrates two parallel frame buffer controllers 1, 2. Each frame buffer controller 1, 2 includes an edge stepper 3, 4, a span stepper 5, 6, and a memory controller 7, 8. The memory controllers 7, 8 are connected to separate VRAMs 9, 10. The display controller combines the pixels stored in both VRAMs 9, 10 to generate the final display. When operating in parallel, each frame buffer controller could be operated to determine the values for specified lines of the screen (spans of pixels). In such an instance, the edge stepper 3, 4 on each frame buffer controller 1, 2 skips the non-specified lines of pixels. Other methods can also be used to interleave the frame buffers.

Although FIG. 2 illustrates two frame buffer controllers, any number is possible. Although the use of multiple frame buffer controllers in parallel can increase processing speed, the assignment of span lines to each frame buffer controller can be inefficient. Depending upon the shape and orientation of a primitive, the processing time for the span lines in frame buffer controllers can vary widely. For example, for a short, wide triangle primitive, one frame buffer controller may have scan lines covering a larger portion of the primitive at the base, and another frame buffer controller may have scan lines covering only a small portion at the tip. Since the primitives are provided simultaneously to each frame buffer controller, the processing time for the whole system depends upon the longest processing time in any frame buffer controller.

Furthermore, multiple frame buffers are typically designed to operate on multi-dimensional primitives, such as triangles. Such primitives have edges which are stepped in one direction and spans which are stepped in a second direction. However, multiple frame buffers designed for optimum performance with triangular primitives do not operate well with vector primitives. The edge stepper steps along the vector, and the span stepper remains idle. Since a single edge stepper determines each point in the vector, the extra frame buffers provide no saving in the processing time for vectors. Furthermore, performing multiple calculations in one cycle, needed to jump along a vector, is complicated. Thus, the frame buffer controllers cannot easily be used to determine only points in a vector corresponding to assigned areas.

Alternatively, frame buffer controllers may be assigned to process different primitives. This would allow the frame buffers to operate separate on different vectors. However, since primitives may be processed in any order, large FIFO memories are needed to reorder the pixel data to the correct positions and adjust for overlapping primitives.

SUMMARY OF THE INVENTION

In light of the varying processing times, it is an object of the present invention to provide multiple frame buffer controllers which are interleaved and operate on vectors with improved processing times. In one aspect of the present invention, each of the multiple frame buffer controllers is assigned a portion of each span line in the display. The portion of the span line assigned to a frame buffer may vary depending upon the span line in order to further improve the efficiency of parallel processing.

In another aspect of the invention, when processing vectors, the edge steppers generate multiple pixels at each iteration. Only the pixels which correspond to the areas assigned to a frame buffer controller are processed further. The other pixels are discarded. Generation of multiple pixels per clock cycles permits parallalization of vector processing and greater efficiency.

In another aspect of the invention, each frame buffer controller includes two memory controllers. According to this aspect of the invention, the frame buffer controller provides alternately pixels or groups of pixels to each memory controller. Furthermore, each memory controller is connected to a separate VRAM.

In another aspect of the invention, each frame buffer includes additional steppers in the edge stepper. The frame buffer controller have sufficent steppers to generate pixels for two vectors simultaneously. Four pixels, two for each vector, can be generated in each clock cycle for greater parallalization.

BRIEF DESCRIPTION OF THE DRAWINGS

For a better understanding of the present invention, reference is made to the accompanying drawings in which.

DETAILED DESCRIPTION

I. System Overview

Figure 3:
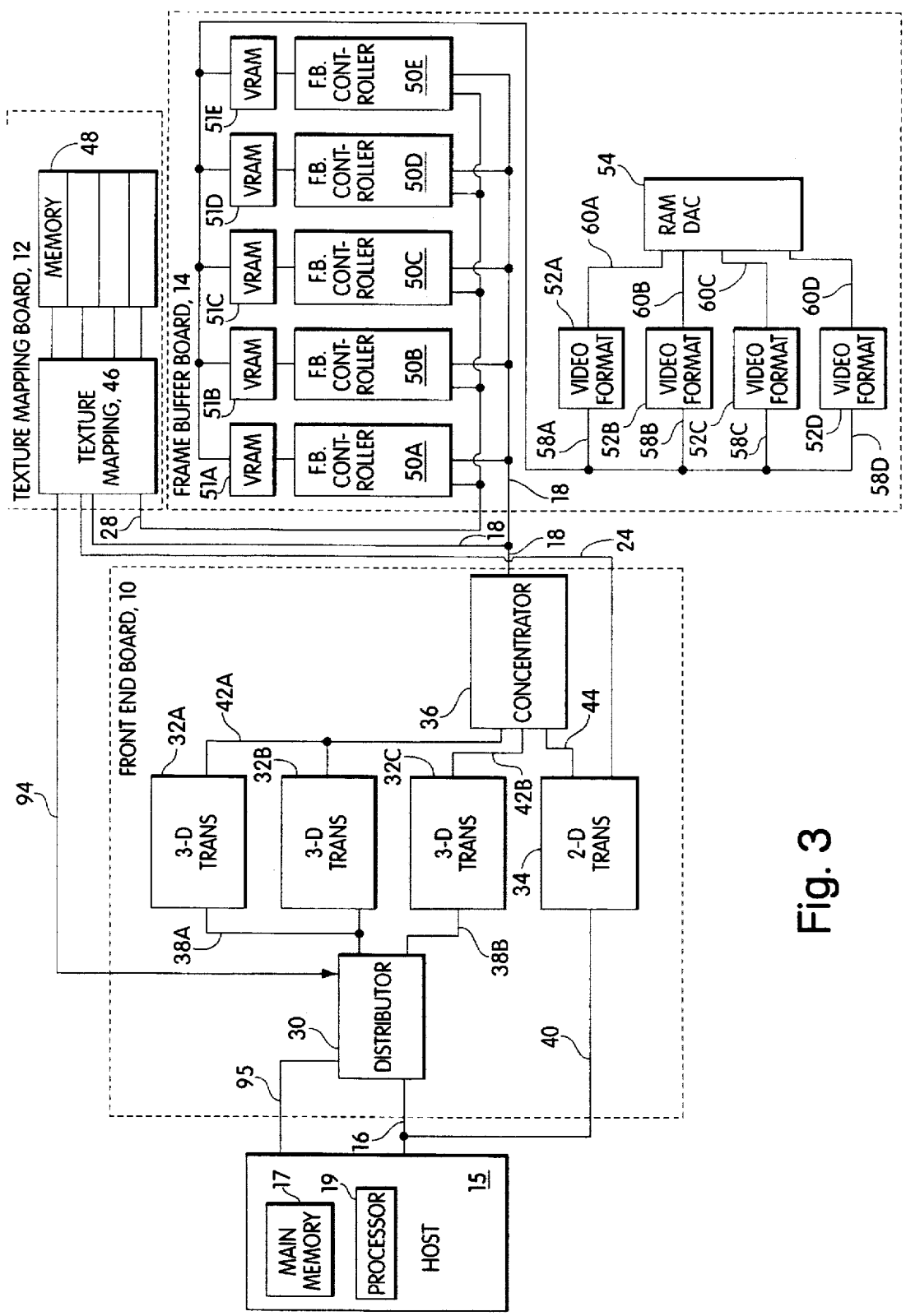
FIG. 3 is a block diagram of one embodiment of the overall computer graphics system of the present invention.

FIG. 3 is a block diagram of one embodiment of a graphics system of the present invention that includes parallel frame buffer controllers. It should be understood that the illustrative implementation shown is merely exemplary with respect to the number of boards and chips, the manner in which they are partitioned, the bus widths, and the data transfer rates. Numerous other implementations can be employed. As shown, the system includes a front end board 11, a texture mapping board 12, and a frame buffer board 14. The front end board communicates with a host computer 15 over a 52-bit bus 16. The front end board receives primitives to be rendered from the host computer over bus 16. The primitives are specified by x,y,z vertex coordinate data, R,G,B, α color data and texture S,T coordinates, all for portions of the primitives, such as for the vertices when the primitive is a triangle. S and T coordinates are not used with vector primitives.

Data representing the primitives in three dimensions then is provided by the front end board 11 to the texture mapping board 12 and the frame buffer board 14 over 85-bit bus 18. The texture mapping board interpolates the primitive data received to compute the screen display pixels that will represent the primitive, and determines corresponding resultant texture data for each primitive pixel. The resultant texture data is provided to the frame buffer board over five 11-bit buses 28, which are shown in FIG. 3 as a single bus to clarify the figure. Although texture mapping is illustrated in the embodiment of FIG. 3, it is not required by the present invention.

The frame buffer board 14 also interpolates the primitive data received from the front end board 11 to compute the pixels on the display screen that will represent each primitive, and to determine object color values for each pixel. The frame buffer board then combines, on a pixel by pixel basis, the object color values with the resultant texture data provided from the texture mapping board, to generate resulting image R,G,B, α values for each pixel. R,G,B, α color control signals for each pixel are respectively provided over R,G,B, α lines 29 to control the pixels of the display screen (not shown) to display a resulting image on the display screen that represents the texture mapped primitive.

The front end board 11, texture mapping board 12 and frame buffer board 14 are each pipelined and operate on multiple primitives simultaneously. While the texture mapping and frame buffer boards operate on primitives previously provided by the front ed board, the front end board continues to operate upon and provide new primitives until the pipelines in the boards 12 and 14 become full.

The front end board 11 includes a distributor chip 30, three three-dimensional (3-D) geometry accelerator chips 32A, 32B and 32C, a two-dimensional (2-D) geometry accelerator chip 34 and a concentrator chip 36. The distributor chip 30 receives the x,y,z coordinate and color primitive data over bus 16 from the host computer, and distributes 3-D primitive data evenly among the 3-D geometry accelerator chips 32A, 32B and 32C. In this manner, the system bandwidth is increased because three groups of primitives are operated upon simultaneously. Data is provided over 40-bit bus 38A to the 3-D geometry accelerator chips 32A and 32B, and over 40-bit bus 38B to chip 32C. Both buses 38A and 38B transfer data at a rate of 60 MHZ and provide sufficient bandwidth to support two 3-D geometry accelerator chips. 2-D primitive data is provided over a 44-bit bus 40 to the 2-D geometry accelerator chip 34 at a rate of 45 MHZ.

Each 3-D geometry accelerator chip transforms the x,y,z coordinates that define the primitives received into corresponding screen space coordinates, determines object R,G,B, α values and texture S,T values for the screen space coordinates, decomposes primitive quadrilaterals into triangles, and computes a triangle plane equation to define each triangle. Each 3-D geometry accelerator chip also performs view clipping operations to ensure an accurate screen display of the resulting image when multiple windows within the screen are displayed, or when a portion of a primitive extends beyond the view volume represented on the display screen. Output data from the 3-D geometry accelerator chips 32A, 32B and 32C respectively is provided over 44-bit buses 42A, 42B and 42C to concentrator chip 36 at a rate of 60 MHZ. Two-dimensional geometry accelerator chip 34 also provides output data to concentrator chip 36 over a 46-bit bus 44 at a rate of 45 MHZ. Concentrator chip 36 combines the 3-D primitive output data received from the 3-D geometry accelerator chips 32A–C, re-orders the primitives to the original order they had prior to distribution by the distributor chip 30, and provides the combined primitive output data over bus 18 to the texture mapping and frame buffer boards.

Texture mapping board 12 includes a texture mapping chip 46 and a local memory 48 which is preferably arranged as a cache memory. In a preferred embodiment of the invention, the local memory is formed from a plurality of SDRAM (synchronous dynamic random access memory) chips. The local memory 48 stores texture MIP map data associated with the primitives being rendered in the frame buffer board. The texture MIP map data is downloaded from a main memory 17 of the host computer 15, over bus 40, through the 2-D geometry accelerator chip 34, and over 24-bit bus 24.

The texture mapping chip 46 successively receives primitive data over bus 18 representing the primitives to be rendered on the display screen. As discussed above, the primitives provided from the 3-D geometry accelerator chips 32A–C include points, lines and triangles. The texture mapping board does not perform texture mapping of points or lines, and operates only upon triangle primitives. The data representing the triangle primitives includes the x,y,z object pixel coordinates for at least one vertex, the object color R,G,B, α values of the at least one vertex, the coordinates in S,T of the portions of the texture map that correspond to the at least one vertex, and the plane equation of the triangle. The texture mapping chip 46 ignores the object pixel z coordinate and the object color R,G,B, α values. The chip 46 interpolates the x,y pixel coordinates and interpolates S and T coordinates that correspond to each x,y screen display pixel that represents the primitive. For each pixel, the texture mapping chip accesses the portion of the texture MIP map that corresponds thereto from the cache memory, and computes resultant texture data for the pixel, which may include a weighted average of multiple texels.

The resultant texture data for each pixel is provided by the texture mapping chip 46 to the frame buffer board over five buses 28. The five buses 28 are respectively coupled to five frame buffer controller chips 50A, 50B, 50C, 50D and 50E provided on the frame buffer board, and provide resultant texture data to the frame buffer controller chips in parallel. The frame buffer controller chips 50A-E are respectively coupled to groups of associated VRAM (video random access memory) chips 51A-E. The frame buffer board further includes four video format chips, 52A, 52B, 52C and 52D, and a RAMDAC (random access memory digital-to-analog converter) 54. The frame buffer controller chips control different, non-overlapping segments of the display screen. Each frame buffer controller chip receives primitive data from the front end board over bus 18, and resultant texture mapping data from the texture mapping board over bus 28. The frame buffer controller chips interpolate the primitive data to compute the screen display pixel coordinates in their respective segments that represent the primitive, and the corresponding object R,G,B, α color values for each pixel coordinate. For those primitives (i.e., triangles) for which resultant texture data is provided from the texture mapping board, the frame buffer controller chips combine, on a pixel by pixel basis, the object color values and the resultant texture data to generate final R,G,B, α values for each pixel to be displayed on the display screen.

The manner in which the object and texture color values are combined can be controlled in a number of different ways. For example, in a replace mode, the object color values can be simply replaced by the texture color values, so that the texture color values are used in rendering the pixel. Alternatively, in a modulate mode, the object and texture color values can be multiplied together to generate the final R,G,B, α values for the pixel. Furthermore, a color control word can be stored for each texel that specifies a ratio defining the manner in which the corresponding texture color values are to be combined with the object color values. A resultant color control word can be determined for the resultant texel data corresponding to each pixel and provided to the frame buffer controller chips over bus 28 so that the controller chips can use the ratio specified by the corresponding resultant control word to determine the final R,G,B values for each pixel.

The resulting image video data generated by the frame buffer controller chips 50A-E, including R,G,B, α values for each pixel, is stored in the corresponding VRAM chips 51A-E. Each group of VRAM chips 51A-E includes eight VRAM chips, such that forty VRAM chips are located on the frame buffer board. Each of video format chips 52A-D is connected to, and receives data from, a different set of ten VRAM chips. The video data is serially shifted out of the VRAM chips and is respectively provided over 64-bit buses 58A, 58B, 58C, and 58D to the four video format chips 52A, 52B, 52C and 52D at a rate of 27 MHZ. The video format chips format the video data so that it can be handled by the RAMDAC and provide the formatted data over 32-bit buses 60A, 60B, 60C and 60D to RAMDAC 54 at a rate of 33 MHZ. RAMDAC 54, in turn, converts the digital color data to analog R,G,B color control signals and provides the R,G,B control signals for each pixel to a screen display (not shown) along R,G,B control lines 29.

Figure 4:
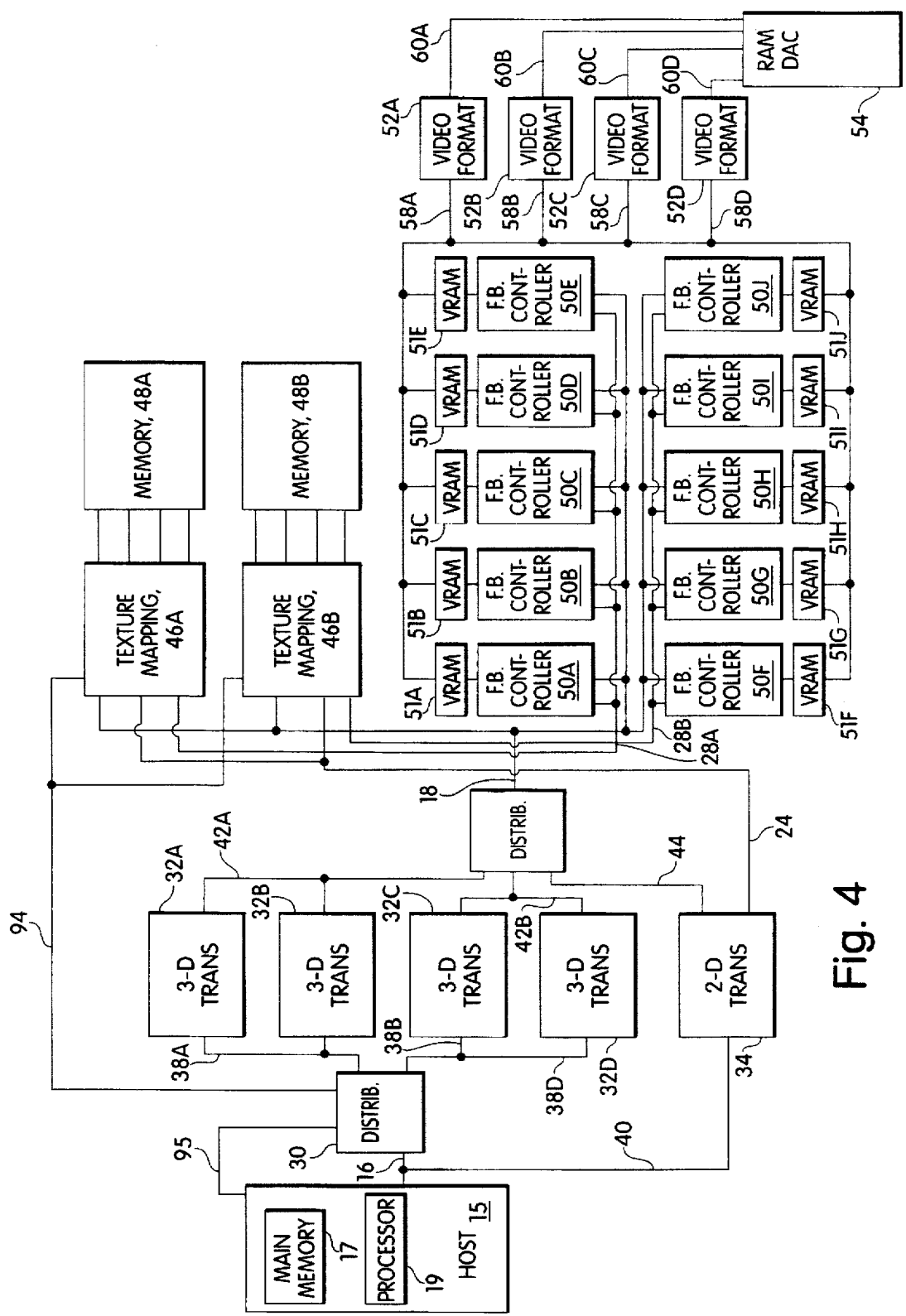
FIG. 4 is a block diagram of another embodiment of the overall computer graphics system of the present invention.

In one embodiment of the invention, hardware on the texture mapping board 12 and the frame buffer board 14 is replicated so that certain primitive rendering tasks can be performed on multiple primitives in parallel, thereby increasing the bandwidth of the system. An example of such an alternate embodiment of the present invention is shown in FIG. 4, which is a block diagram of a computer graphics system of the present invention having certain hardware replicated. The system of FIG. 4 includes four 3-D geometry accelerator chips 32A, 32B, 32C and 32D, two texture mapping chips 46A and 46B respectively associated with cache memories 48A and 48B, and ten frame buffer chips 50A-50J, each with an associated group of VRAM chips. The operation of the system of FIG. 4 is similar to that of the system of FIG. 3, described above. The replication of the hardware in the embodiment of FIG. 4 allows for increased system bandwidth because certain primitive rendering operations can be performed in parallel on multiple primitives.

II. Rasterization Overview

Figure 5:
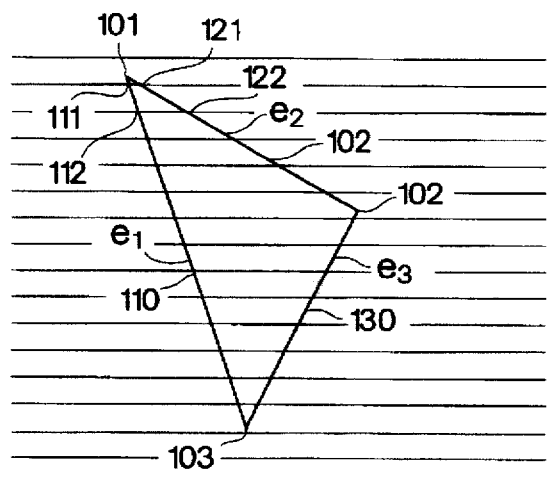
FIG. 5 is a graphical representation of rasterizing a triangular primitive.

FIG. 5 illustrates the rasterization process for a triangular primitive which is performed in the frame buffers. Primitives may include points, vectors, and triangles. According to the overall system of the present invention, the basic primitives are triangles and vectors. For triangles, primitive information on three vertices, 101, 102, 103 of the triangle is provided. The information on each vertex includes x, y, z coordinate values, and R, G, B, α color values. The vertex information for the three vertices is used to determine a plane equation for the primitive. A color gradient and z gradient are determined from the plane equation and are used in determining pixel data. In the rasterization process, the edges 110, 120, 130 ($e_1$, $e_2$, $e_3$,) of the triangle are determined, and then the pixels along each edge are determined. Various methods can be used for determining the pixels along each edge. In one method, the pixels are determined by interpolating between the vertices 101, 103 along edge 110 for each row of pixels or span line to determine the pixels closest to the edge 110. According to another embodiment, pixels are selected so as always to be inside the primitive. This can be accomplished by interpolating x and y values to determine a mathematical position for each edge at each span line. Pixels are then selected to be greater than the edge value for left edges and less than the edge value for a right edge.

One or more rows of pixels are referred to as a span line. The R, G, B color values for the edge pixels 111, 112 are also determined through interpolation of the values at the vertices 101, 103. Similarly, pixels 121, 122 are determined along the opposite edge 120 of the primitive along the same span lines. Then, along each span line, the color values for the pixels are determined based upon the color values for the points along each edge.

Figure 6:
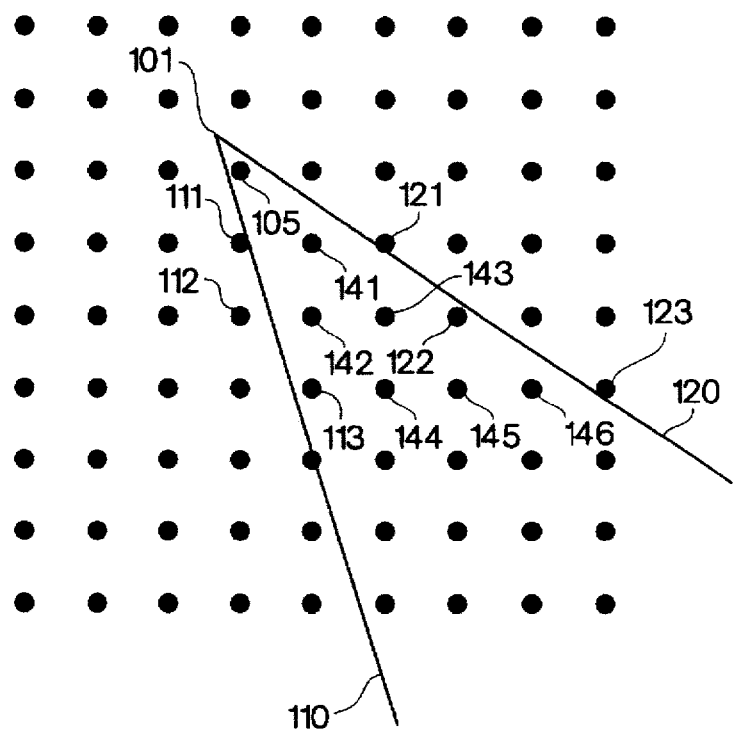
FIG. 6 is another graphical illustration of rasterizing a triangular primitive.

FIG. 6 is a graphical illustration of the rasterization process in greater detail. As illustrated in FIG. 6, pixels of the screen display form a grid of points having corresponding color values. The edge lines 110, 120 of the primitive do not necessarily align with the grid. Therefore, the pixels inside the primitive on each span line of the grid are determined. For example, pixels 105, 111–113 correspond to the first four span lines for edge 110. Pixel 105 is the pixel closest to vertex 101 defining the primitive.

The pixels 141–143 on each span line between the edges are determined based upon the pixels 112, 113, 122, 123 on each span line closest to the edges.

The process for vector primitives is similar to the process for determining the edges. The edge stepper is used to determine the pixel data for the vectors. Alternatively, since the edge stepper can process two edges simultaneously (for the two opposing edges of a triangle), two vectors may also be processed simultaneously. The primitive information for the vector, i.e. the x, y, z coordinate values and R, G, B color values for the ends, are provided to the edge stepper. A color gradient and z gradient are determined for the vector. Alternatively, a position and color values for one end point, the color gradient, z gradient and an length or end value could be provided as the primitive information. In either case, the necessary information about the gradients and end points can be determined from the provided primitive data. The pixels are determined by interpolating between the ends to select the pixels closest to the vector. As with triangular primitives, the pixels on one side of the vector may be used. The x and y values are interpolated to determine a mathematical position for the vector on each span line. The frame buffer controller of the present invention provides improved performance in processing pixel data for vectors. Therefore, only vector processing will be specifically explained with respect to the frame buffers. Processing of other types of primitives would not differ from processing for interleaved frame buffers.

III. Frame Buffer Controllers Interleaved in Two Dimensions

Figure 7:
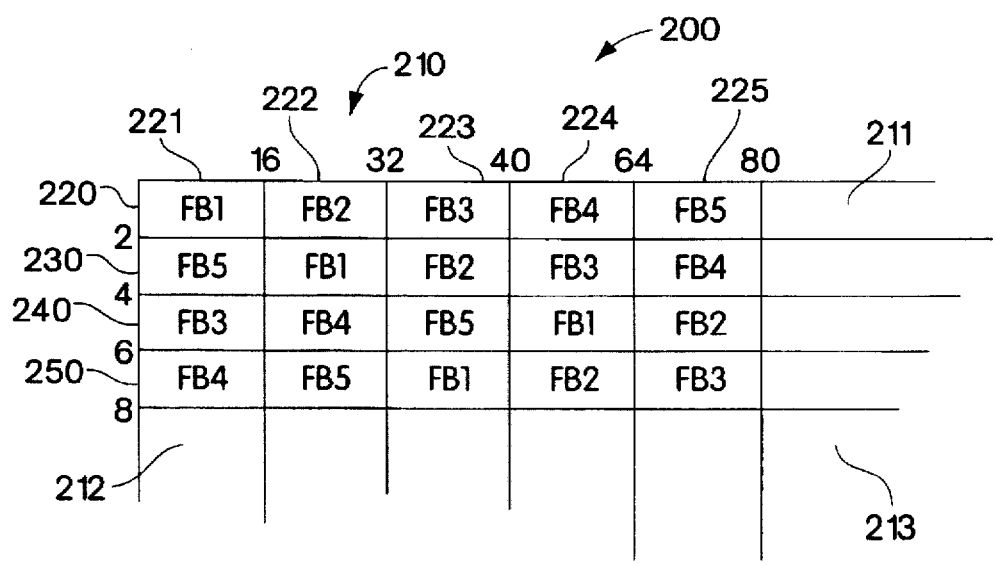
FIG. 7 is a diagram illustrating interleaved frame buffer controllers.

According to the present invention, the multiple frame buffer controllers are assigned portions of the pixel grid, interleaved in two dimensions. As illustrated in FIG. 7, the screen display 200 is separated into tiles 210–213. According to one embodiment of the invention, each tile is 8 pixels by 80 pixels. Each span line 220, 230, 240, 250 encompasses a portion of each tile across the width of the screen. The embodiment shown in FIG. 3 includes five frame buffer controllers. Therefore, each span line in the tile is divided into five sections, 221–225. Each frame buffer is assigned a portion of each span line in the tile for processing. Since primitives may have any position, orientation and size, it may cover any portion of one or more tiles. Therefore, in order to improve processing efficiency, the frame buffer controllers can be assigned blocks dispersed throughout each tile. The volume of processing data in the controller is equalized over several primitives. In fact, a single primitive will not likely utilize all frame buffer controllers. FIFO memories in the frame buffer controllers may be utilized to pipeline processing so that the overall processing across frame buffer controllers is approximately constant. The frame buffer controller assignments are applicable to each tile in the screen. FIG. 7 illustrates assignments for the five frame buffer controllers of the embodiment shown in FIG. 3.

Frame buffers are interleaved in two dimensions in order to increase the bandwidth for screen refresh. By interleaving memory controllers along a span line, the required bandwidth required per memory controller is (total bandwidth)/(number of memory controllers). Also, for large polygons, large fill areas and block transfers, the performance for writing pixels along the scan line is improved due to interleaving frame buffer controllers interleaved on span lines. Performance in processing small triangles and vectors mainly in the y direction is improved by interleaving frame buffer controllers in the y direction.

IV. Frame Buffer Configuration and Operation

Figure 8:
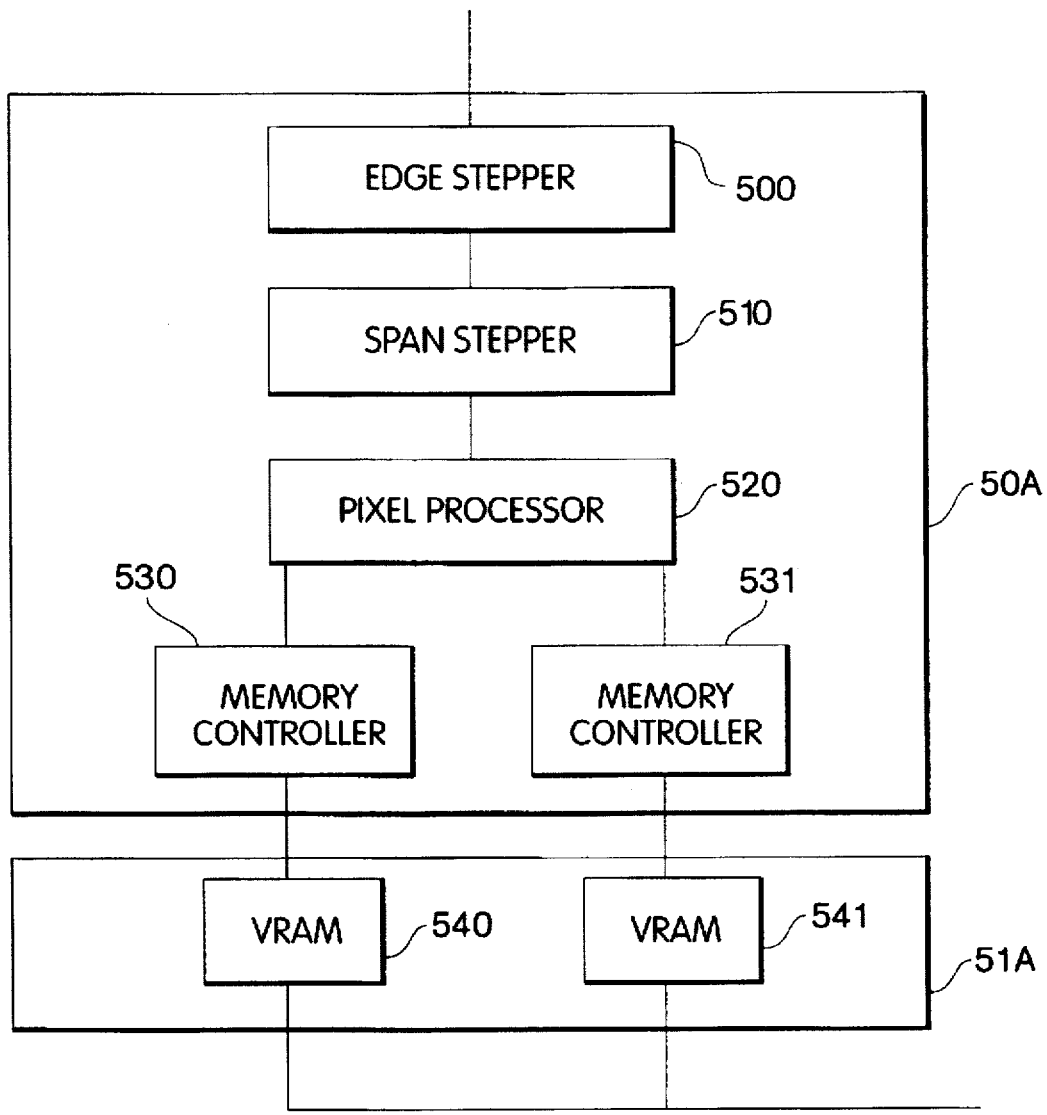
FIG. 8 is a block diagram of an embodiment of the frame buffer controller according to the present invention.

FIG. 8 is a block diagram of a frame buffer controller according to the present invention. The frame buffer controller is formed as a frame buffer controller chip 50A and includes an edge stepper 500, a span stepper 510, a pixel processor 520, and two memory controllers 530, 531. Each of the memory controllers 530, 531 is connected in turn to a VRAM 540, 541. The two VRAMs 540, 541 connected to the frame buffer controller make up the VRAM 51A for the frame buffer controller chip as shown in FIG. 3. As discussed above, each VRAM may include several VRAM chips. Two memory controllers 530, 531 are used to increase processing speed. Although VRAM chips are illustrated, other types of memories, such as SDRAM and SGRAM, can also be used.

The edge stepper 500, span stepper 510, and pixel processor 520 convert the incoming primitive data into the output pixel data. As discussed above, the primitive data includes x, y, z values for the ends of a vector and R, G, B, α color values for the ends. Through interpolation, the edge stepper determines the pixels on each pixel line which define the edges of the primitive. At each clock cycle, the edge stepper determines the pixel data for two pixels, rather than one. The edge stepper then determines whether each of the pixels is within the areas assigned to that frame buffer controller. If not, the pixel data is discarded. Thus, the edge stepper, at each clock cycle, may generate two, one or no pixels for the corresponding areas assigned to the frame buffer controller. If neither of the pixels are within the assigned area, one clock cycle is needed to discard the pixels. If one of the pixels is in the assigned area, only one clock cycle is needed to discard the other pixel and pass the one pixel. When both pixels are in the assigned area, two clock cycles are needed to pass both pixels.

The pixel data for pixels in the corresponding areas assigned to the frame buffer controller are then provided to the span stepper 510. However, for vector primitives, the span stepper does not process the pixel data. Instead, the pixel data is merely passed to the pixel processor 520. A FIFO memory (not shown) may be included between the edge stepper 500 and the span stepper 510. The FIFO memory results in pipelined processing of primitives and pixel data. While the span stepper 520 is determining pixels for a span, the edge stepper can be determining the next edge data for the same primitive, or a new primitive. The FIFO memory may even out processing times for the frame buffer controllers, since all of the pixel data for a primitive does not have to be completely determined in all of the frame buffer controllers before processing of the next primitive commences. Similarly, FIFO memories may be included between the span stepper 510 and the pixel processor 520, and between the pixel processor 520 and the memory controllers 530, 531.

The pixel processor 520 provides other processing for the pixel data. Such processing may include: clipping based upon rectangular clip windows, texel data compositing, fog blending, depth cueing, and screen door transparency determination. Each of these functions requires time to process. If a pixel is discarded, then these further processing steps are not performed, which reduces the total time for processing the pixel data. Since the pixel operations are pipelined, extra processing operations do not slow performance, they merely cause a latency in the generation of the final pixel data.

The processed pixel data is then provided to the memory controllers 530, 531 for storage in the VRAMs. The memory controllers also require time to properly process the pixel data. The total processing time is reduced when some of the pixels are discarded.

Figure 9:
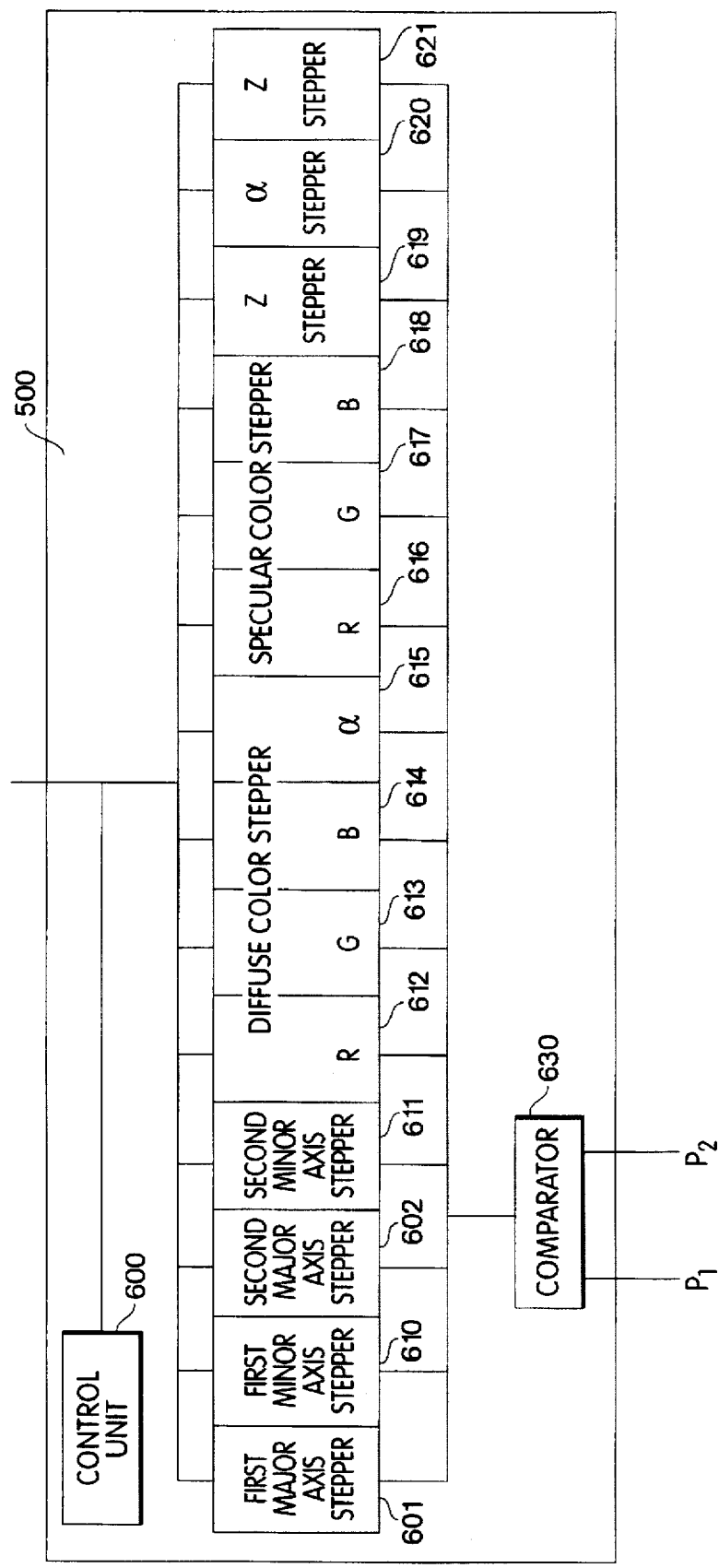
FIG. 9 is a block diagram an edge stepper of the present invention.

The structure of an edge stepper of a frame buffer controller according to the present invention is illustrated in the block diagram of FIG. 9. The edge stepper 500 includes a set of stepper circuits 601, 602, 610–621, a control unit 600, and a comparator. Each of the stepper circuits are used to determine part of the data for each pixel. Position data for the pixels of a vector is determined by a first major axis stepper 601 and a first minor axis stepper 610. When stepping a vector, the x or y direction may be the major axis. The major axis is always stepped along in single units. The minor axis is stepped by fractional amounts. In order to improve processing accuracy, the x axis is used as the major axis for lines which have an angle of 0 to 45 degrees from horizontal, the y axis is used as the major axis for lines which have an angle of 45 to 90 degrees. For triangular primitives, the y axis is always used as the major axis. Therefore, the major axis stepper may be called a y stepper, but the x and y values can simple be reversed in order to to step along lines using the major and minor axes. A second major axis stepper 602 and a second minor axis stepper 611 are used to step along the opposite edge of a triangle primitive. These steppers may be used to generate pixel data for a second vector as discussed below.

Color data is determined by seven steppers 612–618. Four are used for the R, G, B and α values for diffuse colors. Specular color data for R, G, B, α is determined separately so that highlights can be applied before or after the pixel and texel data are combined. A z stepper 619 determines z data. A second z stepper 620 and a second α stepper 621 can be used when rendering two vectors simultaneously.

Figure 10A:
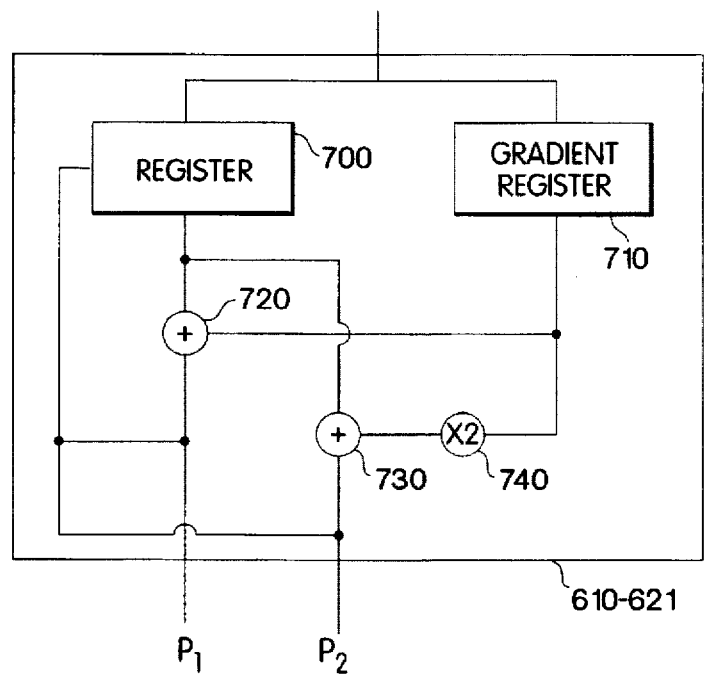
FIGS. 10A and 10B are block diagrams of steppers in an edge stepper of the present invention.
Figure 10B:
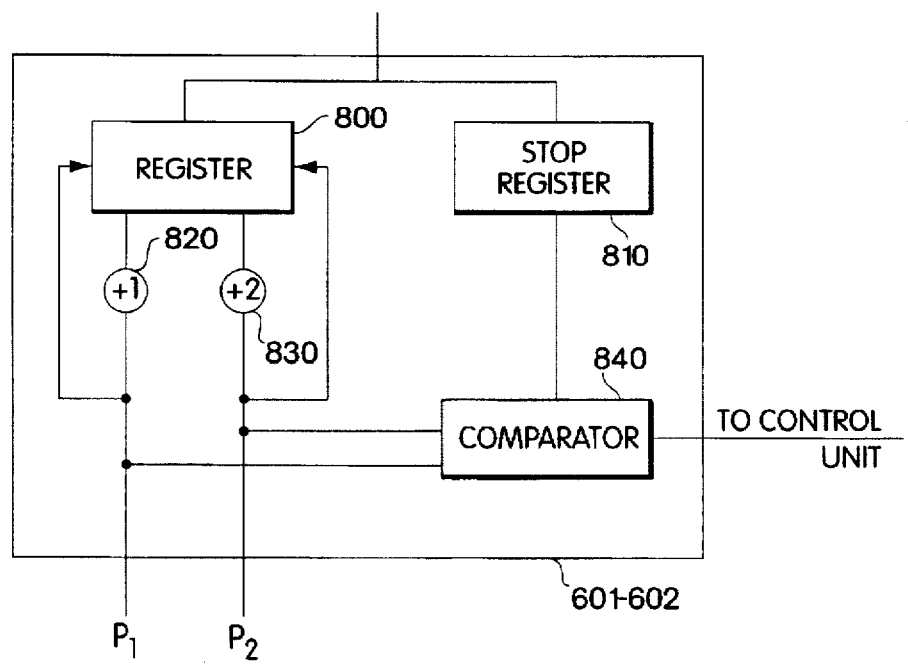

The components of the steppers are illustrated in FIGS. 10A and 10B. Operation of the steppers will be described with respect to these structures. The major axis steppers 601, 602 step by single units and are constructed slightly differently than the other steppers. The major axis steppers 601, 602 include a register 800 into which the initial value is loaded. A stop register 810 receives the final value. In an iterative process, the value of the register is augmented by adders 820, 830. The augmented values are outputted as the values for the next pixels. When rendering triangles, only one value is determined in each cycle. Therefore, the output of adder 820 would be stored in the register 800 as the next pixel value. As discussed above, when rendering vectors, two pixel values are determined at each iteration. Therefore, the output of adder 830 is stored as the next pixel value. The selection of appropriate storage value would be determined by the control unit through an appropriate circuit structure which is not shown. A comparator 840 compares the next pixel value (whether from adder 820 or adder 830) with the stop value. If the next pixel exceeds the stop value, a signal is provided to the control unit 600 to stop processing of that primitive.

The other steppers 610–621 do not necessarily step by whole values. Instead, a gradient register 710 stores a value for the increment to be used in determining the next pixel value. The register 700 receives the initial pixel value for the minor axis, color, z or α value. The pixel value is then augmented at each iteration by the value in the gradient register. When generating two pixel values in an interation, the gradient value is multiplied by two before aumenting the pixel value for the second pixel. A shifting of bits may be used to multiply the values by two. The next pixel value is then outputted by the stepper and stored in the register 700. The iterations continue until the control unit 600 receives a signal from the major axis stepper that the end of the primitive has been reached.

For rendering vectors, each stepper is constructed to generate pixel data for two pixels during each cycle or iteration. A comparator 630 receives the pixel data and determines whether the data corresponds to portions of the display screen assigned to the frame buffer. The data for both, one or no pixels may be discarded in the comparator 630 if it is not to be further processed by the frame buffer.

Rendering of triangles requires twelve steppers: two for the position data for one edge, two for the position data of the opposing edge, four for diffuse colors, three for specular colors, and one for the z value. However, for a vector, only seven steppers are needed: major axis, minor axis, R, G, B, α color values, and z value. Two additional steppers 620, 621 are included in the edge stepper in order to render pixel data for a second vector primitive at the same time. Pixel data for a first vector can be determined by the steppers 601, 610, 612–615, and 619. Pixel data for a second vector can be determined by the steppers 602, 611, 616–618, 620 and 621. This results in generation of pixel data for four pixels during each iteration, which can increase efficiency.

Figure 1:
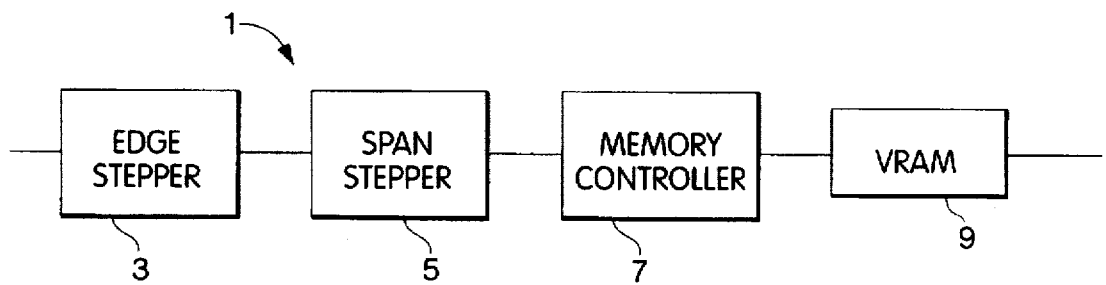
FIG. 1 is a block diagram of a conventional frame buffer controller.
Figure 2:
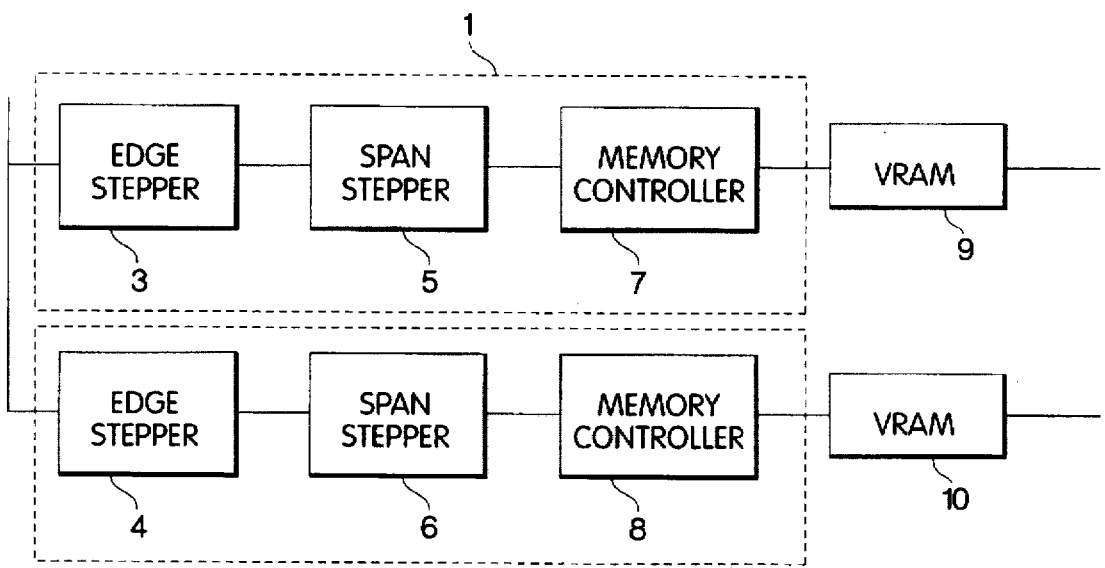
FIG. 2 is a block diagram of conventional parallel frame buffer controllers.

As illustrated in FIGS. 2 and 3, the graphics system of the present invention sends texture mapping information to the frame buffers. Texel data, including R, G, B and alpha values for pixels are sent from the texture mapping board 12 to all of the frame buffer controllers 50A–50E. Since per pixel texel data is provided, the texel data does not need to pass through the edge stepper 500 or span stepper 510 and may be combined with the pixel data in the pixel processor 520, and provided to the memory controllers. As discussed above, various methods can be used to combine the primitive pixel data and the texel data.

The circuitry shown and described herein is given by way of example only. The circuitry is preferably implemented in a large scale custom integrated circuit using logic synthesis software that is commercially available, for example, from Synopsys. The logic synthesis software optimizes and translates circuit descriptions written in high level languages, such as Veralog, into logic gates. The circuitry may be implemented using a CMOS process that produces 1 micron FET's which operate at 5 volts, a CMOS process that produces 0.6 micron drawn gate length devices which operate at 3.3 volts, or any other suitable process for implementing digital circuits. Since the input to the logic synthesis software is functional rather than structural, actual circuits generated by the logic synthesis software may differ from those disclosed herein.

Similarly, the generation of pixel data corresponding to two pixels at each iteration or clock cycle is merely illustrative. Any number of pixels can be simultaneously determined. Processing time for the frame buffer controllers are reduced by the generation of multiple pixel data in a clock cycle. For many interations, the pixel data produced by the edge stepper does not relate to the display areas assigned to the frame buffer controller, and are discarded. Since some of the data produced by the edge stepper is discarded, subsequent processing of the remaining data is significantly reduced. This results in improved performance. The effective performance for all pixels in a frame buffer controller is:

$$\frac{N}{a_o + \sum_{i=1}^{N}(ia_i)} \sum_{i=0}^{N}(a_i) = 1$$

where N is the number of pixels generated per clock cycle, and $a_i$ is the percentage of time that i pixels will be fully processed by a memory controller. With five frame buffers, on average, both pixels will need to be processed ⅕ of the time. Thus, the average processing time will be $$\frac{2}{(1/5*2)+(4/5*1)} = 1.66$$

Thus, processing time for vectors will be 1.66 times faster than a single frame buffer controller.

Having thus described at least one illustrative embodiment of the invention, various alterations, modifications and improvements will readily occur to those skilled in the art. Such alterations, modifications and improvements are intended to be within the spirit and scope of the invention. Accordingly, the foregoing description is by way of example only and is not intended as limiting. The invention is limited only as defined in the following claims and the equivalents thereto.

What is claimed:

1. A frame buffer controller comprising:

an edge stepper receiving primitive data for a vector and generating pixel data for a plurality of pixels along the vector at each clock cycle;

comparison means for comparing the pixel data with at least one display area assigned to the frame buffer controller, said display area covering portions, each less than a full span line, of a plurality of span lines; and a pixel processor for processing the pixel data for pixels in the at least one display area.

2. The frame buffer controller of claim 1, wherein pixel data for two pixels is generated at each clock cycle.

3. The frame buffer controller of claim 1, wherein the edge stepper includes:

a first register for storing a slope;

a second register for storing a current coordinate value;

a first adder for adding the slope to the coordinate value to generate pixel data for a first pixel during a clock cycle;

a second adder for adding two times the slope to the coordinate value to generate pixel data for a second pixel during the clock cycle.

4. The frame buffer controller of claim 1, wherein the pixel data includes coordinate data and color data for pixels along the vector.

5. The frame buffer controller of claim 1, wherein the edge stepper receives primitive data for two vectors and simultaneously generates pixel data for a plurality of pixels along each vectors at each clock cycle.

6. A frame buffer system for a computer graphics system, the frame buffer system comprising:

a plurality of frame buffer controllers receiving primitive data for a vector from the computer graphics system, wherein each frame buffer controller includes:

an edge stepper receiving primitive data for a vector and generating pixel data for a plurality of pixels along the vector at each clock cycle;

comparison means for comparing the pixel data with at least one display area assigned to the frame buffer controller, said display area covering portions, each less than a full span line, of a plurality of span lines; and a pixel processor for processing the pixel data for pixels in the at least one display area.

7. The frame buffer system of claim 6, wherein pixel data for two pixels is generated at each clock cycle.

8. The frame buffer system of claim 7, wherein the edge stepper includes:

a first register for storing a slope;

a second register for storing a current coordinate value;

a first adder for adding the slope to the coordinate value to generate pixel data for a first pixel during a clock cycle;

a second adder for adding two times the slope to the coordinate value to generate pixel data for a second pixel during the clock cycle.

9. The frame buffer system of claim 6, wherein the pixel data includes coordinate data and color data for pixels along the vector.

10. The frame buffer system of claim 6, further comprising at least one memory for storing the pixel data.

11. The frame buffer system of claim 10, wherein each frame buffer controller includes at least one memory controller for writing pixel data in the at least one memory.

12. The frame buffer system of claim 10, wherein the at least one memory includes a plurality of memories corresponding to the plurality of frame buffer controllers.

13. The frame buffer system of claim 6, wherein each edge stepper receives primitive data for two vectors and simultaneously generates pixel data for a plurality of pixels along each vectors at each clock cycle.

14. A method of operating a frame buffer controller comprising the steps of:

assigning at least one area of a display to the frame buffer controller;

converting primitive data for a vector into pixel data for multiple pixels along the vector during each clock cycle;

storing the pixel data for pixels which are in the at least one area of the display assigned to the frame buffer controller, said display area covering portions, each less than a full span line, of a plurality of span lines.

15. The method of claim 14, wherein the generating step generates pixel data for two pixels during each clock cycle.

16. The method of claim 15, wherein the generating step includes the steps of:

storing a slope value;

storing a current pixel coordinate value;

determining a next pixel coordinate value by adding the slope to the current pixel value;

determining a second next pixel coordinate value by adding two times the slope to the current pixel value.

17. The method of claim 16, wherein the slope value is stored as a binary number in a slope register, and wherein the second determining step includes the step of:

determining two times the slope by shifting the value in the slope register to the left.

* * * * *